United States Patent [19]
Kamiya et al.

[11] Patent Number: 5,344,118
[45] Date of Patent: Sep. 6, 1994

[54] SOLENOID VALVE

[75] Inventors: Haruo Kamiya, Atsugi; Chiaki Shiokawa, Kyoto, both of Japan

[73] Assignees: Unisia Jecs Corp, Kanagawa Prefecture; Japan Powder Metallurgy Co. Ltd., Tokyo, both of Japan

[21] Appl. No.: 133,677

[22] Filed: Oct. 8, 1993

[30] Foreign Application Priority Data

Oct. 13, 1992 [JP] Japan .................. 4-71175

[51] Int. Cl.$^5$ .............................. F16K 31/06
[52] U.S. Cl. .................. 251/129.15; 251/356; 251/368
[58] Field of Search ............. 251/129.15, 129.16, 251/356, 368

[56] References Cited

U.S. PATENT DOCUMENTS

| | | | |
|---|---|---|---|
| 2,544,209 | 3/1951 | Wolcott | 251/356 X |
| 2,569,027 | 9/1951 | Stoner | 251/129.15 |
| 5,172,833 | 12/1992 | Faulkner, III | 251/129.15 X |

FOREIGN PATENT DOCUMENTS 3-49781  7/1991  Japan .

Primary Examiner—Arnold Rosenthal
Attorney, Agent, or Firm—Bachman & LaPointe

[57] ABSTRACT

A solenoid valve used in a brake fluid circuit of an anti-lock braking system of an automotive vehicle. The solenoid valve comprises a plunger which is axially movable upon energizing and de-energizing of an armature core located inside a solenoid coil. The plunger is formed of a sintered metal and formed at its tip end with a fitting groove. A spherical metal valve member is fixedly fitted in the fitting groove by caulking an outer peripheral wall surrounding the fitting groove. The valve member is brought into contact with a valve seat member formed with an oil passage through which oil is flowable, upon movement of the plunger toward the valve seat member.

8 Claims, 4 Drawing Sheets

//SOLENOID VALVE

BACKGROUND OF THE INVENTION

1. Field of the Invention

This invention relates to improvements in a solenoid valve adapted to make an open-and-close control of an oil passage or the like, and more particularly to the structure of a plunger of the solenoid valve to securely keeping a spherical valve member at its tip end.

2. Description of the Prior Art

As is well known, a plurality of solenoid valves of normally closed or opened types are provided in a fluid circuit, for example, of an anti-lock braking system for an automotive vehicle. A typical one of these solenoid valves is disclosed in Japanese Patent Publication No. 3-49781 and shown in FIG. 6 in the drawings of the present application.

In FIG. 6, a valve body 1 is formed thereinside a plurality of oil passages 2a, 2b. A solenoid coil 3 forming part of a solenoid valve V is disposed in the valve body 1. A cylindrical armature core 4 is disposed inside the inner peripheral portion of the solenoid coil 3. A movable plunger 5 is disposed inside the cylindrical armature core 4 and slidably movable in the axial direction of the cylindrical armature core 4. The plunger 5 is formed of a magnetic material which is relatively low in hardness or rigidity. The plunger 5 is generally cylindrical to form an axially extending central hole 5a in which a pair of valve members 6, 7 are press-fitted and fixed. The valve members 6, 7 are generally rod-like and have a circular cross-section, and located spaced and opposite to each other. The valve members 6, 7 respectively project from the opposite ends of the cylindrical armature 5. The valve members 6, 7 are respectively seatable on valve seats 9, 10 which are respectively formed with passage holes 8a, 8b. The passage holes 8a, 8b are respectively in communication with the oil passages 2a, 2b.

When the armature core 4 is energized or de-energized upon current supply or interruption to the solenoid coil 3, the plunger 5 moves axially leftward or rightward so that the tip end portion 6a, 7a of each valve member 6, 7 is seated on or separated from each valve seat 9, 10, thus making an open-and-close control of the passage openings 8a, 8b.

However, drawbacks have been encountered in the above conventional solenoid valve V, in which the valve members 6, 7 are press-fitted in the central hole 5a of the plunger 5 low in rigidity and therefore there is the possibility of the plunger 5 being cracked or broken down under an excessive load stress applied to the inner peripheral surface of the plunger 5 particularly in case that a press-fitting force is high or a press-fitting area of each valve member to the plunger is relatively small.

In view of this, it may be proposed that the plunger 5 is formed by machining a metal material high in rigidity in order to prevent the plunger from being damaged. However, if the plunger 5 is formed of the high rigidity metal material, a necessary magnetic characteristics amount not be obtained thereby not only lowering a movement response of the plunger but also inviting a degraded operational efficiency in production and a raised production cost. Additionally, the outer peripheral surface of the valve members 6, 7 is required to be machined at a high accuracy in order to obtain a suitable press-fitting force. Furthermore, the tip end portion 6a, 7a of the frustoconical shape is required to be machined at a high accuracy to obtain a sufficient tight fit with the valve seat 9, 10. Also from this view point, the conventional solenoid valve V is degraded in operational efficiency in production and is unavoidably raised in production cost.

SUMMARY OF THE INVENTION

It is an object of the present invention to provide an improved solenoid valve which can overcome drawbacks encountered in similar conventional solenoid valves.

Another object of the present invention is to provide an improved solenoid valve which is high in durability so that a plunger of the solenoid valve is effectively prevented from cracking and broken out in use while maintaining a sufficient magnetic characteristics thereof.

A further object of the present invention is to provide an improved solenoid valve which is high in operational efficiency in production and low in production cost.

A still further object of the present invention is to provide an improved solenoid valve which has a plunger formed of a sintered metal which is low in hardness and rigidity, in which a metal spherical valve member is fixedly fitted at the tip end of the plunger.

A solenoid valve of the present invention comprises a valve body. A solenoid coil disposed inside the valve body. An armature coil is fixedly disposed inside the solenoid coil. A valve seat member is formed with a fluid passage through which a fluid is flowable. A movable member or plunger is formed of a sintered metal and formed at its one end with a fitting groove. The movable member is moved in opposite directions upon energizing and de-energizing of the armature core. A spherical valve member is fixedly fitted in the fluting groove of the movable member. The spherical valve member is brought into contact with the valve seal member to close the fluid passage when the movable valve member is moved in a direction toward the valve seat member. Additionally, a caulked section forming part of the movable member is formed around the fitting groove in a manner to urgingly contact with the valve member so as to securely keep the spherical valve member in the fitting groove.

According to the principle of the present invention, the spherical valve member is fixedly secured in the fitting groove by caulking the outer peripheral wall (forming part of the movable member) of the fitting groove. Consequently, an excessive load stress can be prevented from being applied to the movable member thereby avoiding cracking, break-down and the like of the movable member. As a result, it has become possible that the movable member is formed of the sintered metal which is low in hardness or rigidity. By this, the movable member is fabricated by a molding without machining while obtaining a sufficient magnetic characteristics. Additionally, the spherical valve member inherently can obtain high surface smoothness and sphericity. These improve the operational efficiency in production and largely lower the production cost for the solenoid valve.

BRIEF DESCRIPTION OF THE DRAWINGS

In the drawings, like reference numerals designate like elements and parts throughout all FIGURES, in which.

DETAILED DESCRIPTION OF THE INVENTION

Figure 1:
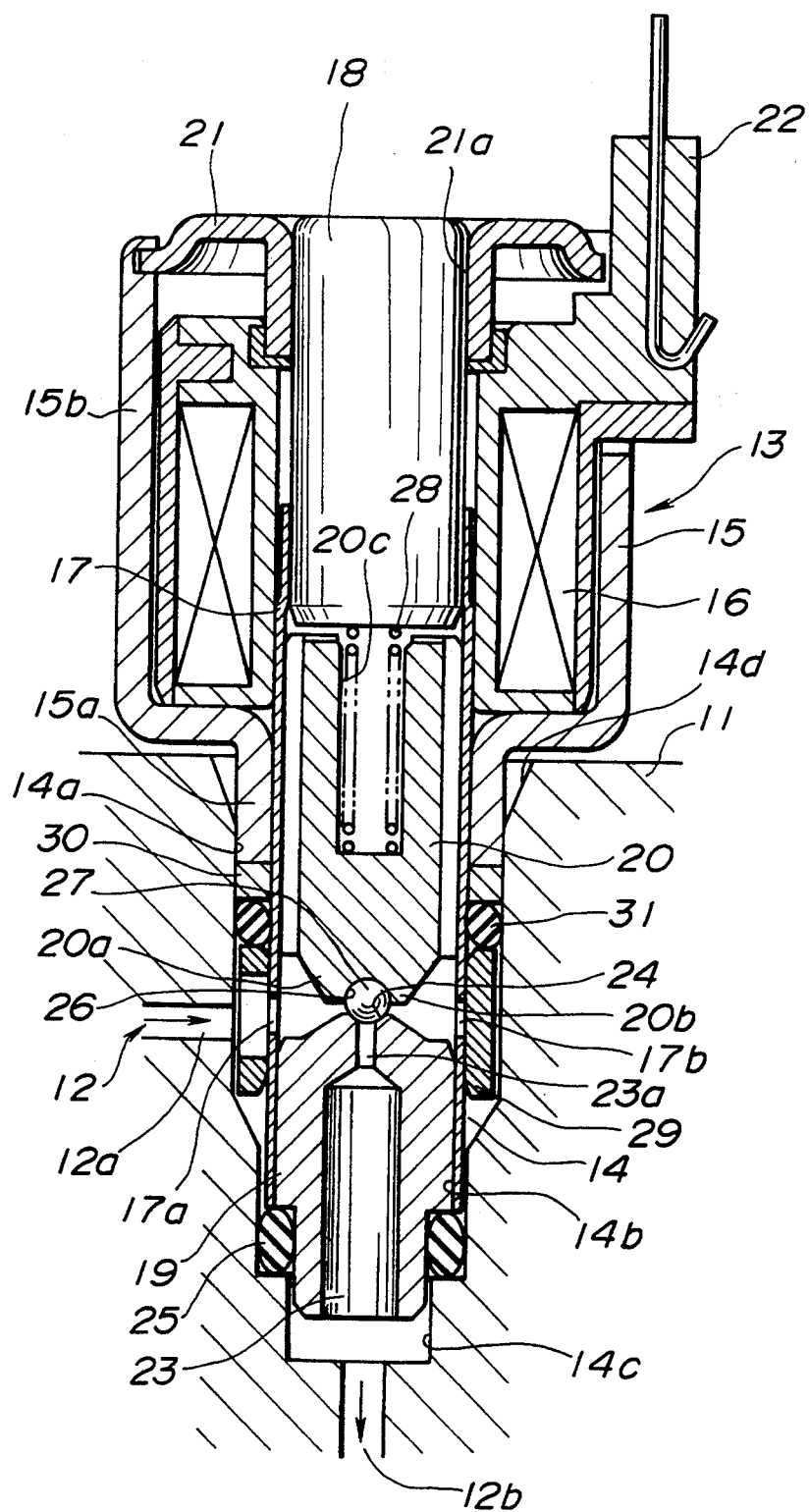
FIG. 1 is a vertical sectional view of an embodiment of a solenoid valve according to the present invention.

Referring now to FIG. 1, an embodiment of a solenoid valve according to the present invention is illustrated by the reference numeral 13. The solenoid valve 13 of this embodiment is used in a brake fluid pressure circuit of an anti-lock braking system shown) for an automotive vehicle. The solenoid valve 13 is fixedly disposed in a valve opening 14 formed at the upper end section of a housing 11 in which a plurality of oil passages 12 (only one shown) and a reservoir (not shown) are formed. The oil passage 12 includes an oil flow-in part 12a which is opened to the side of the solenoid valve 13 so that oil flows therethrough into the solenoid valve 13. An oil flow-out part 12b of the oil passage 12 is opened to the bottom of the valve opening 14 so that oil is discharged therethrough from the bottom of the valve opening 14. The valve opening 14 includes a large diameter section 14a, a medium diameter section 14b and a small diameter section 14C which are formed stepwise and decrease in diameter in a direction far from the surface of the housing 11. The large diameter section 14a has an annular tapered portion 14d in order to smoothly insert the solenoid valve 13 into the valve opening 14.

The solenoid valve 13 includes a valve body 15 which includes a cylindrical lower small-diameter section 15a which is fitted in the large diameter section 14a of the valve opening 14. The cylindrical upper large-diameter section 15b of the valve body 15 is integral with the small-diameter section 15a and located outside of the valve opening 14. The valve body 15 is made of a magnetic metal. A solenoid coil 16 is disposed inside the valve body large-diameter section 15b and pressed through an electric wire connector 22 by a cap 21 made of a magnetic material, so that solenoid coil 16 is securely maintained in position. The cap 21 is fixed in position by caulking the upper end of the valve body large-diameter section 15b. A sleeve 17 is disposed along the inner peripheral side of the solenoid coil 16 and extends downward to come into the valve opening 14. An armature core 18 is disposed inside the inner peripheral surface of an upper end portion of the sleeve 17 and extends upward to be press-fitted in a fitting opening 21a of the cap 21. The armature core 18 is generally cylindrical or of the columnar shape.

A valve seat member 19 is generally cylindrical and formed axially with a communication passage 23 through which the above-mentioned oil flow-in and flowout parts 12a, 12b of the oil passage 12 are communicable. The valve seat member 19 is formed at its upper tip end with a valve seat portion 24 having a spherical surface. The communication passage 23 has a small-diameter section 23a which is opened through the spherical surface of the valve seat portion 24. The valve seat member 19 is fitted to the inner peripheral surface of a lower end portion of the sleeve 17 and fitted in the medium diameter section 14b through an O-ring 25 disposed between the outer peripheral surface of the lower section of the valve seat member 19 and the inner peripheral surface of the valve opening medium diameter section 14b. It will be understood that the O-ring 25 is for the purpose of maintaining an oil-tight seal between the valve seat member 19 and the inner surface of the housing 11.

A plunger or movable valve member 20 is made of a ferrite sintered metal and formed generally cylindrical. The plunger 20 is movably disposed between the armature core 18 and the valve seat member 19. The plunger 20 is located inside the sleeve 17 and has a generally frustoconical lower tip end section 20a which is formed with a generally hemispherical fitting groove 26. A ball or spherical valve member 27 is disposed in the fitting groove 26 and fixed therein under the action of an annular caulked section C (shown in FIGS. 2 and 3) forming part of an outer peripheral wall 20b for the ball valve member 27. The outer peripheral wall 20b forms part of the lower tip end section 20a. The ball valve member 27 is adapted to be seated on and separates from the valve seat portion 24 thereby closing or opening the communication passage small-diameter section 23a. The plunger 20 is formed with an axially extending hole 20c opened to the upper end thereof. A compression spring 28 is disposed in the hole 20c and located between the lower end of the armature core 18 and the bottom surface of the hole 20c thereby biasing the plunger 20 in such a direction that the ball valve member 27 is urgingly brought into contact with the spherical surface of the valve seat portion 24 of the valve seat member 19.

Figure 2:
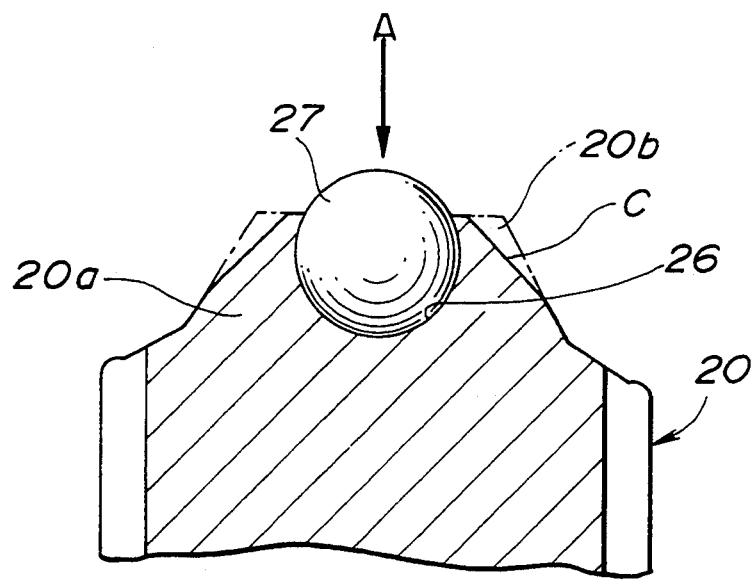
FIG. 2 is an enlarged fragmentary sectional view of a plunger used in the solenoid valve of FIG. 1.
Figure 3:
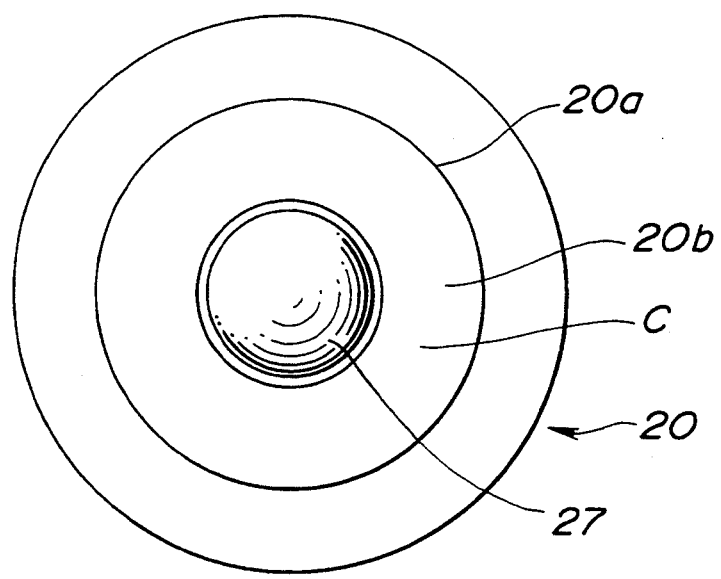
FIG. 3 is a plan view of the plunger as viewed from a direction indicated by an arrow A in FIG. 2.
Figure 4:
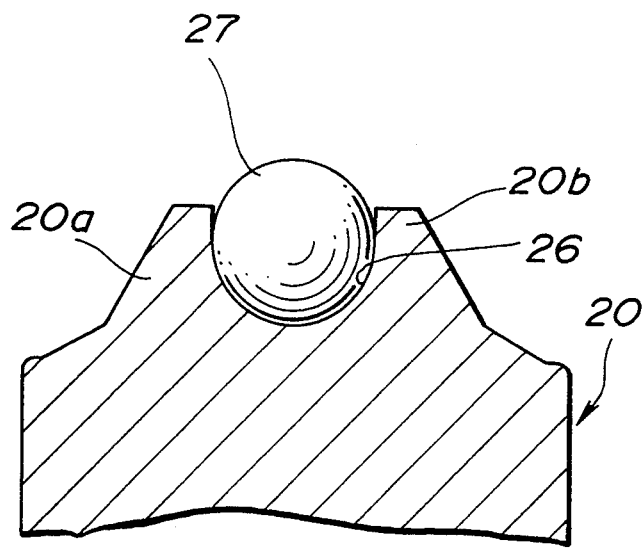
FIG. 4 is a view similar to FIG. 2 but showing a state before caulking is made at the tip end section of the plunger.

As shown in FIGS. 2 to 4, and more specifically FIG. 4, the ball valve member 27 is fitted in the fitting groove 26 as follows: The fitting groove 26 is formed generally hemispherical and has an inner diameter slightly larger than the outer diameter of the ball valve member 27. The fitting groove 26 has an inner surface area covering about ⅔ of the surface area of the ball valve member 27. Accordingly, the ball valve member 27 can be fitted into the fitting groove 26 under a relatively low pressing force of the fingers of a human's hand. The ball valve member 27 is formed of steel and projects from the fitting groove 26 by about ⅓ of its peripheral surface since about ⅔ of the peripheral surface of the ball valve member 27 is covered with the inner peripheral surface of the fitting groove 26. It will be understood that the about ⅔ of the peripheral surface of the ball valve member 27 maintains a surface-to-surface contact between it and the outer peripheral wall 20b of the tip end section 20a of the plunger 20. After the ball valve member 27 is fitted as discussed above and shown in FIG. 4, the whole periphery of the outer peripheral wall 20b near the opening of the fitting groove 26 is caulked inward to form the caulked portion C as shown in FIGS. 2 and 3, so that the ball valve member 27 is fixedly secured inside the fitting groove 26 of the plunger 20.

The armature core 18 and the valve seat member 19 are respectively welded to the upper and lower end portions of the sleeve 17 so that components parts including the plunger 20 are constituted as a single unit. The sleeve 17 is formed with a pair of through-holes 17a, 17b which are in communication with the flow-in part 12a of the oil passage 12. A filmer (assembly) 29 is disposed to cover the through-holes 17a, 17b. A backup ring 30 and an O-ring 31 for sealing are disposed between the filter 29 and the lower end of the small-diameter section 15a of the valve body 15.

The functions and advantageous effects of the above-discussed solenoid valve 13 will be discussed hereinafter.

The solenoid valve 13 is assembled as follows: After the ball valve member 27 is fixed to the lower tip end section 20a of the plunger 20 as discussed above, the valve seat member 19, the plunger 20, the compression spring 28 and the armature core 18 are successively positioned in the sleeve 17 thus assembling the single unit. Subsequently, the single unit is assembled in the valve body 15 in which the solenoid coil 16 has been fixedly disposed. Then, the O-ring 25 is installed around the valve seat member 19 at a predetermined position, and then filter 29, the O-ring 31 and the backup ring 30 are installed on the outer peripheral surface of the sleeve 17 at predetermined positions, thus completing the assembly of the solenoid valve 13. Subsequently, the solenoid valve 13 is inserted into and fixed in the valve opening 14 while accomplishing the positioning of it, so that the assembling operation of the solenoid valve 13 in the housing 11 is facilitated. Particularly since the plunger 20 and the like constitute the single unit through the sleeve 17, the assembling operation of the whole solenoid valve 13 can be simplified while facilitating the maintenance of the solenoid valve 13.

As discussed above, the ball valve member 27 is fixed in position by caulking the whole periphery of the outer peripheral wall 20b after the ball valve member 27 is fitted in the fitting groove 26 of the plunger 20. Consequently, a uniform load is applied to the outer peripheral wall 20b of the plunger 20 thereby to prevent a concentrated load stress from being applied, during fixing of the ball valve member 27 in position. Accordingly, the plunger 20 can be securely prevented from being cracked or broken down. Particularly by virtue of the fact that the major part of the peripheral surface of the ball valve member 27 is fixed in position in such a manner to be wrapped with the relatively large spherical inner surface of the fitting groove 26, a surface-to-surface contact in a large area is maintained between the ball valve member 27 and the inner surface of the fitting groove 26 so that the load stress due to the caulking is effectively dispersed thereby further contributing prevention of crack and break-down of the plunger 20.

As a result, it has been possible that the plunger 20 is made of and fabricated from a sintered metal which is low in hardness or rigidity. This improves the operational efficiency in production and lowers production cost as compared with a case that the plunger is produced by machining or the like. Additionally, in case the sintered body as the plunger 20 is caulked, the pores in the sintered body absorbs the stress due to the caulking and therefore the plunger 20 can be prevented from changing in magnetic characteristics.

Thereafter, discussion will be made on an experimental test in which the plunger 20 (provided with the ball valve member 27) prepared as discussed above was subjected to a durability test under the following conditions:

Testing machine: An electrically operated servo 100kgf fatigue tester
30 Test temperature: 120° C.
Load : 0.35–10.0 kgf
Repeated number: $10^6$(20Hz)

Before and after the durability Lest, the whole length and the coercive force of the plunger 20 were measured to obtain permanent set characteristics in fatigue and change in magnetic characteristics. The results of measurement are shown in TABLE 1.

TABLE 1

| Item | Before Test | After Test |
| --- | --- | --- |
| Whole length (mm) | 16.02 | 16.02 |
| Coercive force (A/m) | 258 | 260 |

As shown in TABLE 1, even after the durability test, the ball valve member 27 never made its getting-off from the fitting groove 26 and its play within the fitting groove 26. Additionally, the plunger 20 never made its permanent setting in fatigue and its change (reduction) in magnetic characteristics.

Furthermore, since the valve member 27 is spherical and not in the shape of a rod having a circular cross-section, a high surface smoothness and a high sphericity can be readily obtained. This raises the operational efficiency in production and lowers production cost while improving contact with the valve seat portion 24 of the valve seat member 19 to obtain a good sealing ability against the valve seat member 19.

Moreover, when the plunger 20 slidingly moves inside the sleeve 17 upon energizing of the armature core 18 so that the ball valve member 27 strikes against the valve seat portion 24, the reaction force of the ball valve member 27 is received by the whole the inner surface of the fitting groove 26 and therefore the bearing stress is lowered thereby softening the impact load against the plunger 20. Accordingly, the plunger 20 can be prevented from deformation or the like while preventing the ball valve member 27 from making its play.

Figure 5:
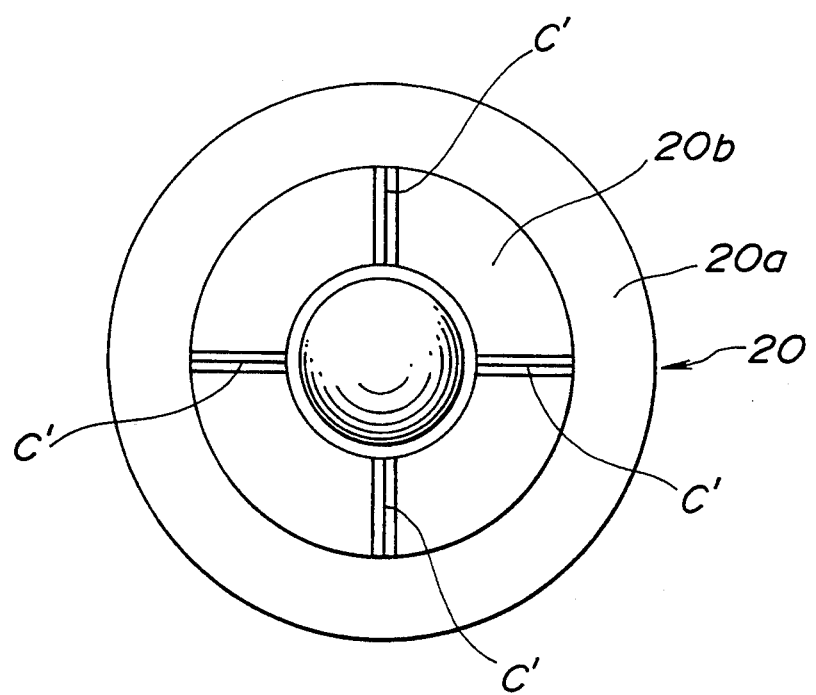
FIG. 5 is a plan view similar to FIG. 3 but showing a modified example of the plunger of the solenoid valve of the present invention.
Figure 6:
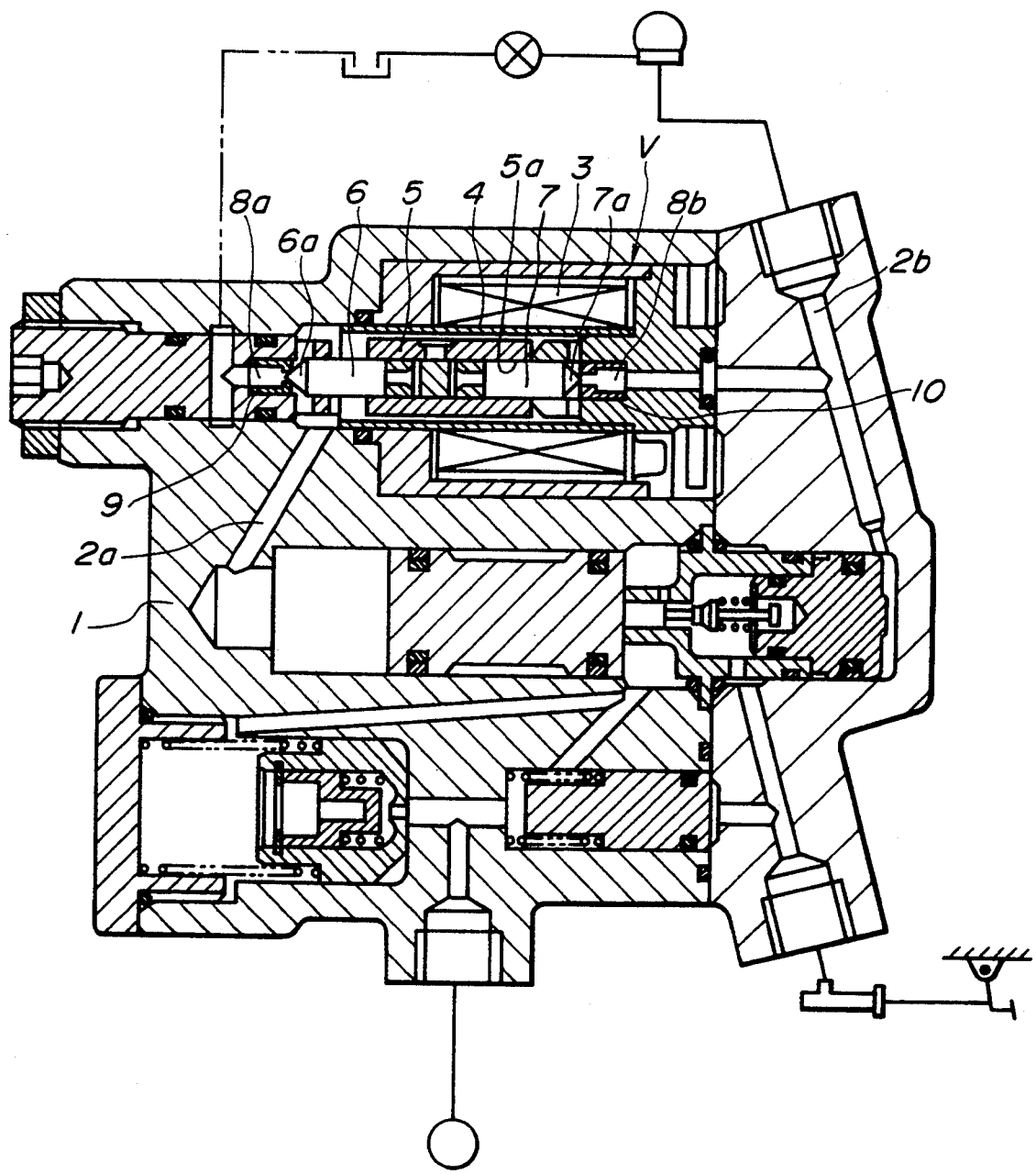
FIG. 6 is a cross-sectional view of a part of a fluid circuit of an anti-lock braking system, including a conventional solenoid valve.

FIG. 5 shows a modified example of the plunger 20 to be used in the solenoid valve 13, which is similar to that of the embodiment of FIG. 1 except for the caulking manner of the outer peripheral wall 20b of the plunger lower tip end section 20a. In this example, the outer peripheral wall 20b of the plunger 20 is caulked crosswise to form caulked sections or caulking marks C' at the lower tip end section 20a of the plunger 20.

According to this example, the ball valve member 27 is rigidly fixed in position with the four caulked sections C' of the outer peripheral wall 20b. Additionally, since the caulking is accomplished at four parts of the outer peripheral wall 20b and not along the whole periphery of the same wall 20b, a necessary caulking force is small as compared with the case in which the caulking is made along the whole periphery of the peripheral wall 20b, thereby saving energy so as to improve the operational efficiency in caulking and contributing to production cost reduction of the solenoid valve 13. It will be understood the number of the caulked sections C' is not limited four, and therefore may be three, five or others.

While the ball valve member 27 has been shown and described as being made of steel, it will be understood that the ball valve member 27 may be made of ceramic. In this case, a weight-lightening of the plunger 20 is accomplished in addition to the fact that the main body of the plunger 20 is made of the sintered metal so as to reduce the inertial force of the plunger 20 thereby improving the opening-and-closing response for the communication passage small-diameter section 23a. It will be appreciated that the solenoid valve 13 of the present invention may be used in a variety of systems other than the anti-lock braking system.

What is claimed is:

1. A solenoid valve comprising:
   a valve body;
   a solenoid coil disposed inside said valve body;
   an armature core fixedly disposed inside said solenoid coil;
   a valve seat member formed with a fluid passage through which a fluid is flowable;
   a movable member formed of a sintered metal and formed at its one end with a fitting groove, said movable member being moved in opposite directions upon energizing and de-energizing of said armature core;
   a spherical valve member fixedly fitted in said fitting groove of said movable member, said spherical valve member being brought into contact with said valve seat member to close said fluid passage when said movable member is moved in a direction toward said valve seat member; and
   means defining a caulked section formed around said fitting groove and urgingly contacting with said spherical valve member to securely keep said spherical valve member in said fitting groove, said caulked section forming part of said movable member.

2. A solenoid valve as claimed in claim 1, wherein said caulked section is formed by caulking a peripheral wall of said fitting groove toward said spherical ball member, said peripheral wall forming part of said movable member.

3. A solenoid valve as claimed in claim 1, wherein said caulked section is annular no surround said spherical valve member.

4. A solenoid valve as claimed in claim 1, wherein said caulked section is at least three caulked sections formed around said spherical valve member.

5. A solenoid valve as claimed in claim 1, wherein said armature core, said movable member and said valve seat member are axially aligned so that said movable member is located between said armature core and said valve seat member.

6. A solenoid valve as claimed in claim 1, wherein said movable member is axially elongate and axially movable between said armature core and said valve seat member, said movable member being generally cylindrical and formed at said one end with a generally frustoconical tip end section at which said fitting groove is formed.

7. A solenoid valve as claimed in claim 1, wherein said spherical valve member is made of steel.

8. A solenoid valve as claimed in claim 1, wherein more than ½ of surface area of said spherical valve member is embedded in said fitting groove.

* * * * *